(12) United States Patent
Kerscher et al.

(10) Patent No.: US 10,183,354 B2
(45) Date of Patent: Jan. 22, 2019

(54) WELD STUD FOR DRAWN-ARC STUD WELDING

(71) Applicant: Bayerische Motoren Werke Aktiengesellschaft, Munich (DE)

(72) Inventors: Erich Kerscher, Mengkofen (DE); Reinhard Holzner, Reisbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/345,643

(22) Filed: Nov. 8, 2016

(65) Prior Publication Data

US 2017/0066073 A1 Mar. 9, 2017

Related U.S. Application Data

(63) Continuation of application No. PCT/EP2015/065647, filed on Jul. 9, 2015.

(30) Foreign Application Priority Data

Jul. 30, 2014 (DE) .................. 10 2014 214 932

(51) Int. Cl.
*B23K 9/20* (2006.01)
*B23K 35/28* (2006.01)
*B23K 35/02* (2006.01)

(52) U.S. Cl.
CPC .......... *B23K 9/207* (2013.01); *B23K 35/0288* (2013.01); *B23K 35/286* (2013.01)

(58) Field of Classification Search
CPC ....................................................... B23K 9/207
USPC ............................................................ 219/99
See application file for complete search history.

(56) References Cited

U.S. PATENT DOCUMENTS

| | | | | |
|---|---|---|---|---|
| 3,010,011 A * | 11/1961 | Darlington, Jr. | ........ | B23K 9/201 219/105 |
| 3,114,031 A * | 12/1963 | Dash | .................. | B23K 35/0288 219/99 |
| 5,618,491 A * | 4/1997 | Kurup | ................ | B23K 35/0288 110/330 |
| 6,077,096 A * | 6/2000 | Moring | .................... | H01R 4/64 439/801 |
| 2002/0030037 A1* | 3/2002 | Sichtermann | ............ | B21K 1/44 219/99 |

(Continued)

FOREIGN PATENT DOCUMENTS

| CN | 103917324 A | 7/2014 |
|---|---|---|
| DE | 30 22 054 A1 | 12/1981 |
| DE | 295 07 827 U1 | 8/1995 |

(Continued)

OTHER PUBLICATIONS

Chinese-language Office Action issued in counterpart Chinese Application No. 201580022966.8 dated Aug. 10, 2018 with English translation (twelve (12) pages).

(Continued)

*Primary Examiner* — Ibrahime A Abraham
*Assistant Examiner* — Spencer h Kirkwood
(74) *Attorney, Agent, or Firm* — Crowell & Moring LLP

(57) ABSTRACT

A weld stud for drawn-arc stud welding has a functional portion and a welding portion which represents one end of the weld stud and which is delimited by a front face that is curved outwards in a longitudinal direction of the weld stud.

11 Claims, 2 Drawing Sheets

(56) References Cited

U.S. PATENT DOCUMENTS

2014/0064832 A1    3/2014   Rotheut et al.

FOREIGN PATENT DOCUMENTS

| DE | 199 01 823 A1 | 7/2000 | | |
|---|---|---|---|---|
| DE | 10 2011 076 261 A1 | 11/2012 | | |
| EP | 0 526 164 A1 | 2/1993 | | |
| EP | 1 060 823 A1 | 12/2000 | | |
| GB | 1395632 A | * | 5/1975 | ............... B23K 9/20 |
| WO | WO 01/70442 A2 | 9/2001 | | |
| WO | WO 01/70442 A3 | 9/2001 | | |

OTHER PUBLICATIONS

International Search Report (PCT/ISA/210) issued in PCT Application No. PCT/EP2015/065647 dated Sep. 7, 2015, with English translation (six (6) pages).

German-language Written Opinion (PCT/ISA/237) issued in PCT Application No. PCT/EP2015/065647 dated Sep. 7, 2015 (six (6) pages).

German Search Report issued in counterpart German Application No. 10 2014 214 932.0 dated May 20, 2015, with partial English translation (thirteen (13) pages).

Chinese language Office Action issued in counterpart Chinese Application No. 201580022966.8 dated Mar. 30, 2018 with English translation (thirteen (13) pages).

\* cited by examiner

WELD STUD FOR DRAWN-ARC STUD WELDING

CROSS REFERENCE TO RELATED APPLICATIONS

This application is a continuation of PCT International Application No. PCT/EP2015/065647, filed Jul. 9, 2015, which claims priority under 35 U.S.C. § 119 from German Patent Application No. 10 2014 214 932.0, filed Jul. 30, 2014, the entire disclosures of which are herein expressly incorporated by reference.

BACKGROUND AND SUMMARY OF THE INVENTION

The invention relates to a weld stud for drawn-arc stud welding.

In the case of drawn-arc stud welding, a metal stud is welded onto a component. For this purpose, an arc is ignited between the face surface of the stud and the component. The stud is initially placed onto the component, and a pilot current is activated. By virtue of the metal stud being lifted slightly from the component, the arc is drawn. The two parts are melted, and are joined together by the exertion of a light pressure.

Weld studs for drawn-arc stud welding normally have a functional section, which in the welded state permits the fastening of components or parts, and a welding section, by way of which the weld studs are welded to a component. The welding section is intended for being at least partially melted during the welding process and for entering into a cohesive connection with the component.

FIG. 1 shows a conventional weld stud 1 for drawn-arc stud welding. The welding section 2 is of conical form with a shell surface 3 and has, at its free end, a face surface 4 in the form of a shallow frustum, which ends in a planar section 5. The face surface 4 thus has two edges: a first edge K1, which delimits the planar section 5, and a second edge K2 at the transition between face surface 4 and shell surface 3. For the welding, the weld stud 1 is, by way of the planar section 5 of the face surface 4, firstly placed onto the component and then removed therefrom, whereby the arc is ignited between component and face surface 4.

With this form of stud, it is however often possible to realize only inadequate quality of the welded connection. In the welding region, defects arise as a result of non-uniform, unilateral melting of the welding flange, or non-uniform melting of the component occurs. As a result, the weld seam that is formed is uneven, resulting in oblique positioning of the stud. Furthermore, for example if too much welding energy is used, evaporation of the material situated in the marginal region of the face surface occurs, whereby the strength of the joining connection is no longer ensured.

The invention is therefore based on the object of providing a weld stud by way of which, even with non-optimum configuration of the welding parameters, uniform melting can be realized, and improved quality of the welded connection can be achieved.

These and other objects are achieved by way of a weld stud according to the invention for drawn-arc stud welding, which weld stud has a functional section and a welding section. The welding section forms an end of the weld stud and is delimited by a face surface which is domed outwardly in the longitudinal direction of the weld stud.

The invention is based on the realization that, through the formation of a face surface with an outwardly domed form, the tendency of the arc to run along the edge of the stud face surface can be counteracted. Owing to the convex form of the face surface, the arc does not migrate to a particular position, whereby the uniformity of the melting can be considerably increased.

The functional section of the weld stud serves for the fastening of a component or of a part and may be formed with an external or internal thread or may take on other forms suitable for the intended function, such as, for example, a hook, an eyelet, one or more pins, etc.

The welding section is that section of the weld stud which, during the welding, is at least partially melted and enters into a cohesive connection with the component.

In a preferred embodiment, the face surface is of rotationally symmetrical form with respect to a longitudinal axis of the weld stud and, in particular, has the shape of a spherical segment, of a segment of an ellipsoid or of a segment of an elliptical paraboloid.

Particularly uniform melting can be achieved if the face surface has, in the longitudinal direction of the weld stud, a dome height of at least 1.5 mm or more and, in particular, of 2 mm and more.

In one refinement, the uniformity of the melting may be further increased by virtue of the face surface transitioning in continuous fashion, without an edge, into a side surface which delimits the welding section, that is to say the face surface and side surface have a common tangent at their common boundary.

In a preferred refinement, the face surface adjoins a conical section whose diameter widens, proceeding from the diameter of the face surface, with increasing distance from the face surface.

To increase the overall strength, the face surface may, in the case of a weld stud whose functional section has a thread, have a diameter which is at least as large as the core diameter of the thread.

The weld stud may preferably be manufactured in one piece, or the welding section and the functional section may be composed of different materials and cohesively connected to one another. In one refinement, the weld stud is manufactured in one piece from an aluminum alloy.

The weld stud described above may be used in particular for drawn-arc stud welding on a vehicle body, on chassis components or in the field of battery or accumulator technology (e.g. high-voltage batteries). The weld stud according to the invention leads to more constant quality of the stud welds with fewer failures, and is not sensitive to process disruptions.

The above-described characteristics, features and advantages of this invention, and the manner in which these are achieved, will become clearer and better understandable in conjunction with the following description of the exemplary embodiments. Where the expression "may be" is used in this application, this represents both the technical possibility and the actual technical implementation.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
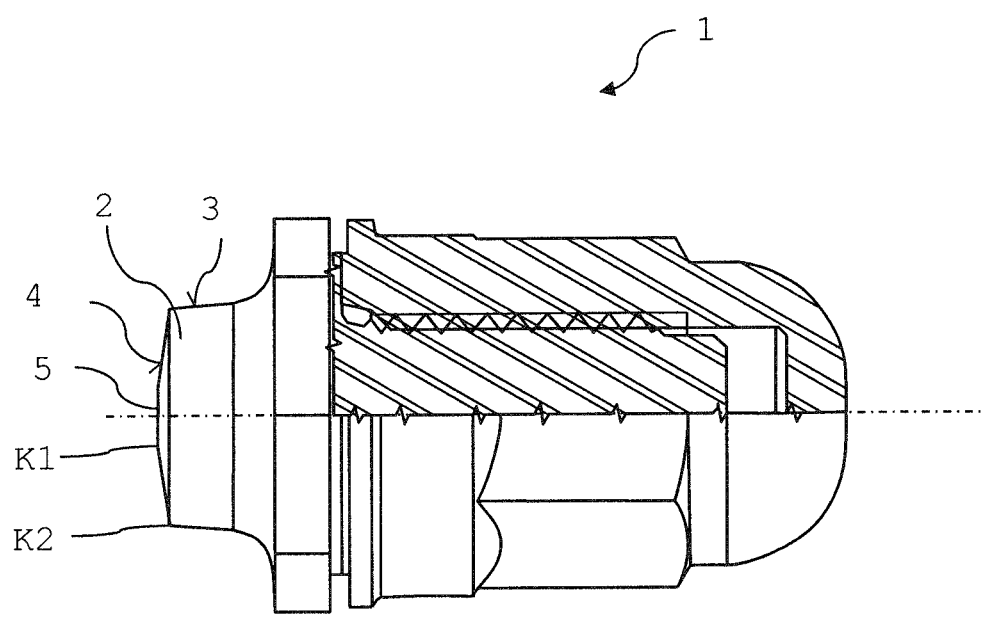
FIG. 1 illustrates a weld stud according to the prior art.
Figure 2:
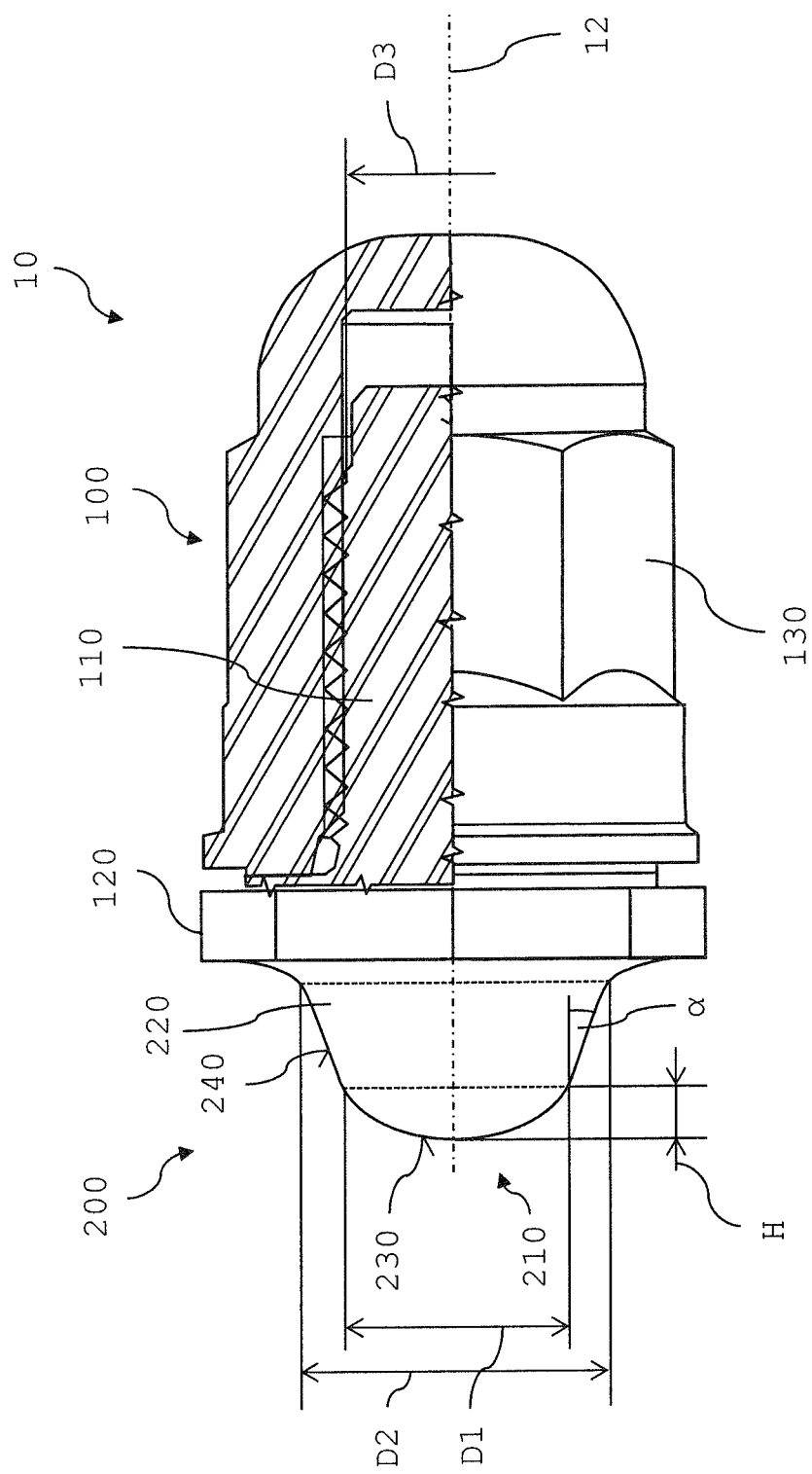
FIG. 2 illustrates a weld stud according to an exemplary embodiment of the invention.

The weld stud 10 shown in FIG. 2, having a longitudinal axis 12, has a functional section 100 and a welding section 200. The functional section 100 includes a threaded stud 110 and an octagonal flange 120 formed on the foot of the functional section 100. A cap nut 130 has been pre-mounted on the threaded stud.

The welding section 200 adjoins the octagonal flange 130 of the functional section 100. Since the welding section 200 is of rotationally symmetrical form with respect to the longitudinal axis 12, only one side view is shown. The welding section 200 has, as viewed along the longitudinal axis 12 of the weld stud 10, a shape which converges toward the free end 210 and which has a conical section 220 which transitions into an outwardly domed face surface 230. To the sides, the welding section 200 is delimited by a side surface 240.

As per FIG. 2, the face surface 230 has the shape of a segment of an ellipsoid of revolution, wherein the longitudinal axis 12 of the weld stud corresponds to the axis of rotation of the ellipsoid. The face surface 230 has a dome height H in the direction of the longitudinal axis 12 of the weld stud and has a diameter D1 transversely with respect to the longitudinal axis 12. The diameter D1 of the face surface 230 is greater than the core diameter D3 of the threaded stud 110.

The conical section 220 is indicated in FIG. 2 by the dashed lines. The conical section 220 directly adjoins the face surface 230 and, there, likewise has the diameter D1. With increasing distance from the free end 210, the diameter of the conical section 220 increases to the diameter D2. The shell surface of the conical section 220 is inclined relative to the longitudinal axis 12 of the weld stud 10 by an angle α. The angle α preferably lies in a range from 15 to 25°, and in particular in a range from 20 to 24°. For example, in the case of a weld stud which has a threaded stud with an M10 external thread with a core diameter of D3=8.16 mm, the diameter D1 is 9 mm, the diameter D2 is 11 mm and the dome height H is 2 mm.

The face surface 210 and the side surface 240 transition into one another in continuous fashion without an edge, that is to say the face surface 210 and side surface 240 have a common tangent at their common boundary. As per FIG. 2, the welding section 200 is formed entirely without an edge, that is to say, from the conical section to the octagonal flange, the side surface 240 likewise has a continuous profile.

Even though the figures show a weld stud with external thread and pre-mounted cap nut, other types of weld studs may alternatively be used. Likewise, the face surface may have other outwardly domed shapes.

The exemplary embodiments are not true to scale and are not restrictive. Deviations are possible within the scope of the practice of a person skilled in the art.

LIST OF REFERENCE DESIGNATIONS

1 Weld stud
2 Welding section
3 Shell surface
4 Face surface
5 Planar section
10 Weld stud
12 Longitudinal axis
100 Functional section
110 Threaded stud
120 Octagonal flange
130 Cap nut
200 Welding section
210 Free end
220 Conical section
230 Face surface
240 Side surface
D1, D2, D3 Diameter
H Dome height
K1, K2 Edge The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A weld stud for drawn-arc stud welding, comprising:
   a functional section; and
   a welding section which forms an end of the weld stud for drawn-arc stud welding and which is delimited by a face surface which is domed outwardly in a longitudinal direction of the weld stud, wherein
   the face surface transitions in a continuous fashion, without an edge, into a side surface which delimits the welding section,
   the welding section has a conical section which adjoins the face surface and whose diameter widens, proceeding from a diameter of the face surface, with increasing distance from the face surface, and
   a shell surface of the conical section forms, relative to a longitudinal axis of the weld stud, an angle ranging from 15° to 25°.

2. The weld stud according to claim 1, wherein
   the face surface is of rotationally symmetrical form with respect to a longitudinal axis of the weld stud.

3. The weld stud according to claim 1, wherein
   the face surface is of rotationally symmetrical form having a shape of a spherical segment, a segment of an ellipsoid or a segment of an elliptical paraboloid.

4. The weld stud according to claim 1, wherein
   the face surface has, in the longitudinal direction of the weld stud, a dome height of at least 1.5 mm or more.

5. The weld stud according to claim 1, wherein
   the face surface has, in the longitudinal direction of the weld stud, a dome height of at least 2 mm or more.

6. The weld stud according to claim 1, wherein
   the functional section has a thread, and the face surface has a diameter which is at least as large as a core diameter of the thread.

7. The weld stud according to claim 1, wherein the weld stud is manufactured in one piece from an aluminum alloy.

8. The weld stud according to claim 1, wherein
   the face surface and the side surface have a common tangent at a common boundary thereof.

9. A method of performing drawn-arc stud welding, the method comprising the acts of:
   providing a weld stud having a functional section including a flange and a welding section adjoining the flange, the welding section including a face surface and a side surface, the side surface including a conical area adjoining the face surface and a concave area connecting the conical area to the flange, the welding section forming an end of the weld stud and being delimited by the face surface that is domed outwardly in a longitudinal direction of the weld stud, and transitions in a continuous fashion, without an edge, into the side surface, wherein a diameter of the conical area widens, proceeding from a diameter of the face surface, with increasing distance from the face surface, and wherein a shell surface of the conical area forms, relative to a longitudinal axis of the weld stud, an angle ranging from 15° to 25°; and performing drawn-arc stud welding using the provided weld stud on a vehicle body, a chassis component, or a battery component.

10. The method according to claim 9, wherein the face surface is of rotationally symmetrical form with respect to a longitudinal axis of the weld stud.

11. The method according to claim 9, wherein
the face surface has, in the longitudinal direction of the weld stud, a dome height of at least 1.5 mm or more.

\* \* \* \* \*